June 20, 1944.　　　　F. LAMBERTI　　　　2,351,979
LIFE-SAVING AND EXPLORING DEVICE FOR
SUBMERGED SUBMARINE VESSELS
Filed May 14, 1941　　　　5 Sheets-Sheet 1

Inventor:
FRANCESCO LAMBERTI

By Attorney.

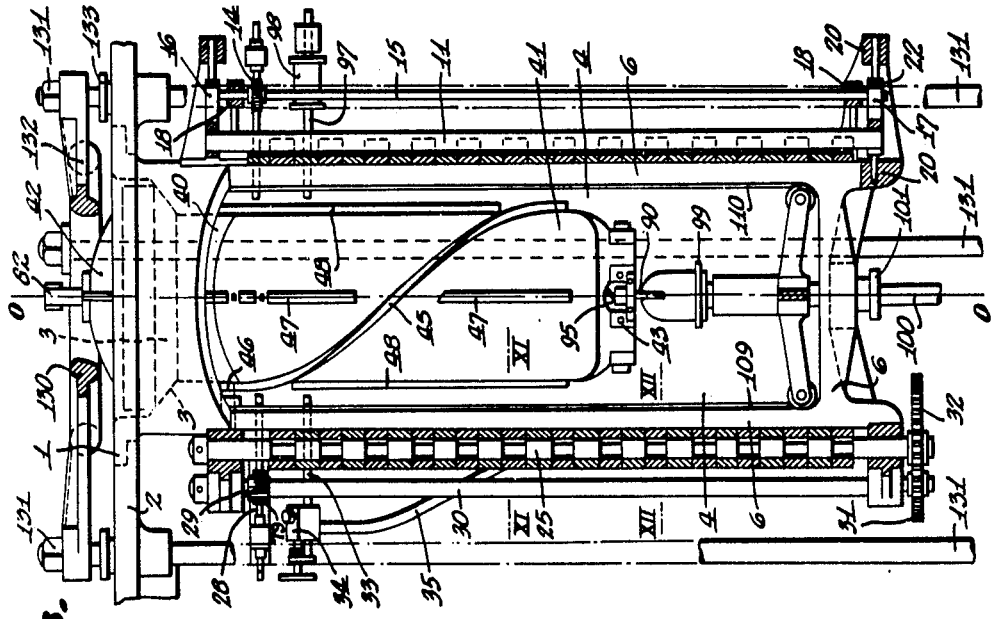

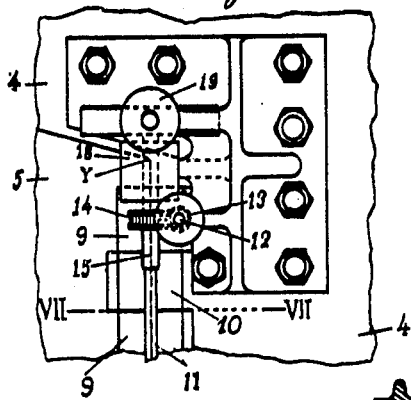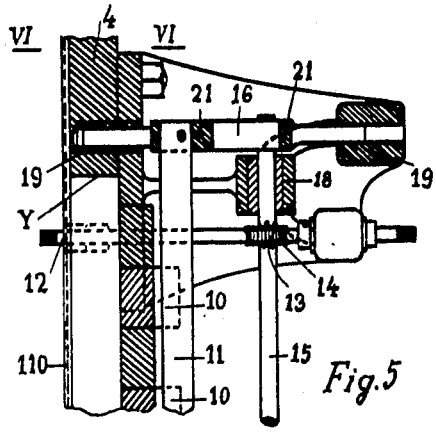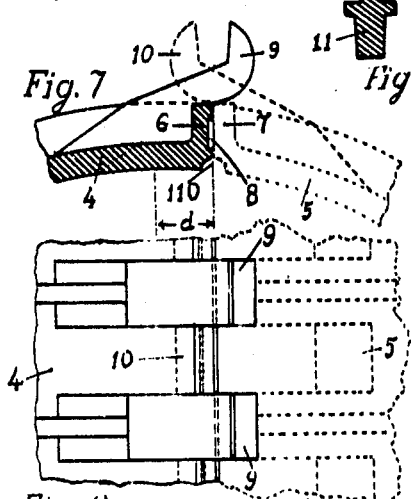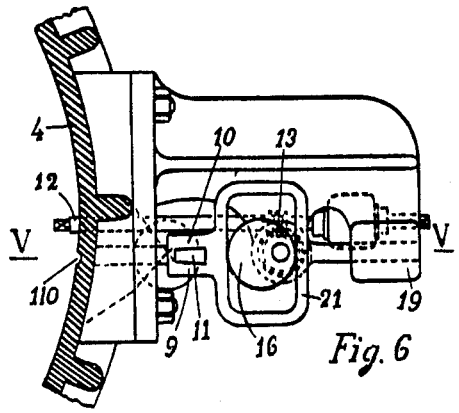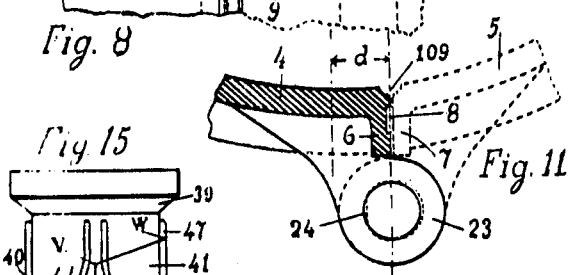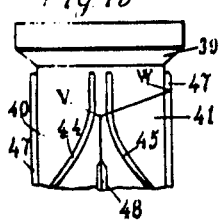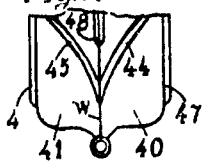

June 20, 1944.     F. LAMBERTI     2,351,979
LIFE-SAVING AND EXPLORING DEVICE FOR
SUBMERGED SUBMARINE VESSELS
Filed May 14, 1941     5 Sheets-Sheet 4
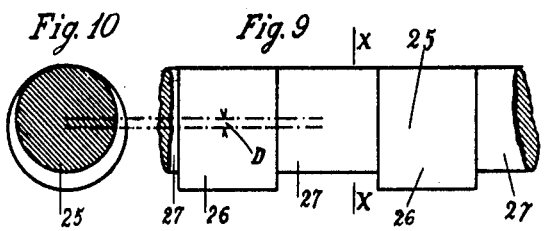
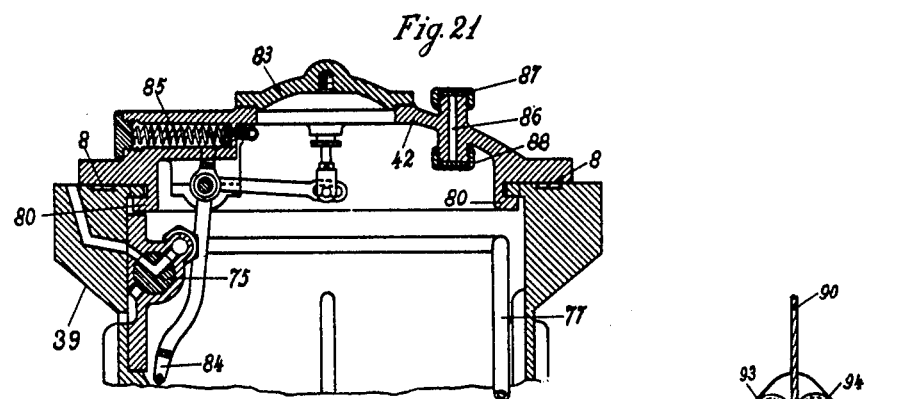
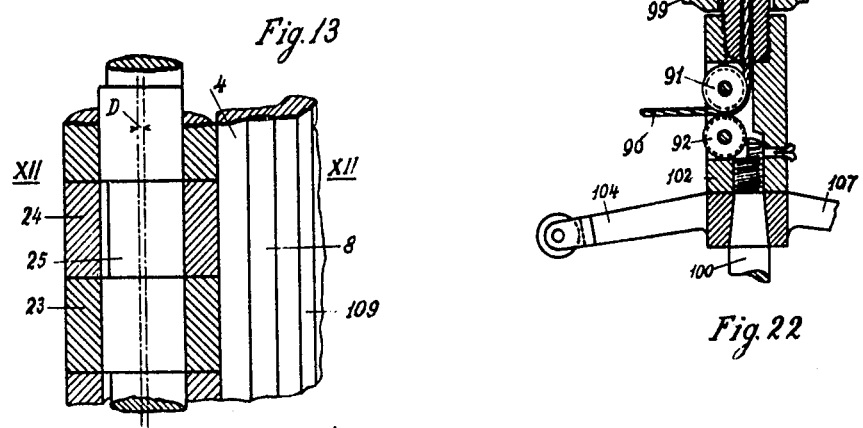
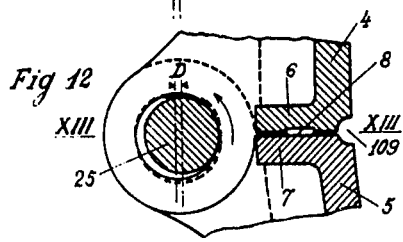
Francesco Lamberti
By [signature]
Atty

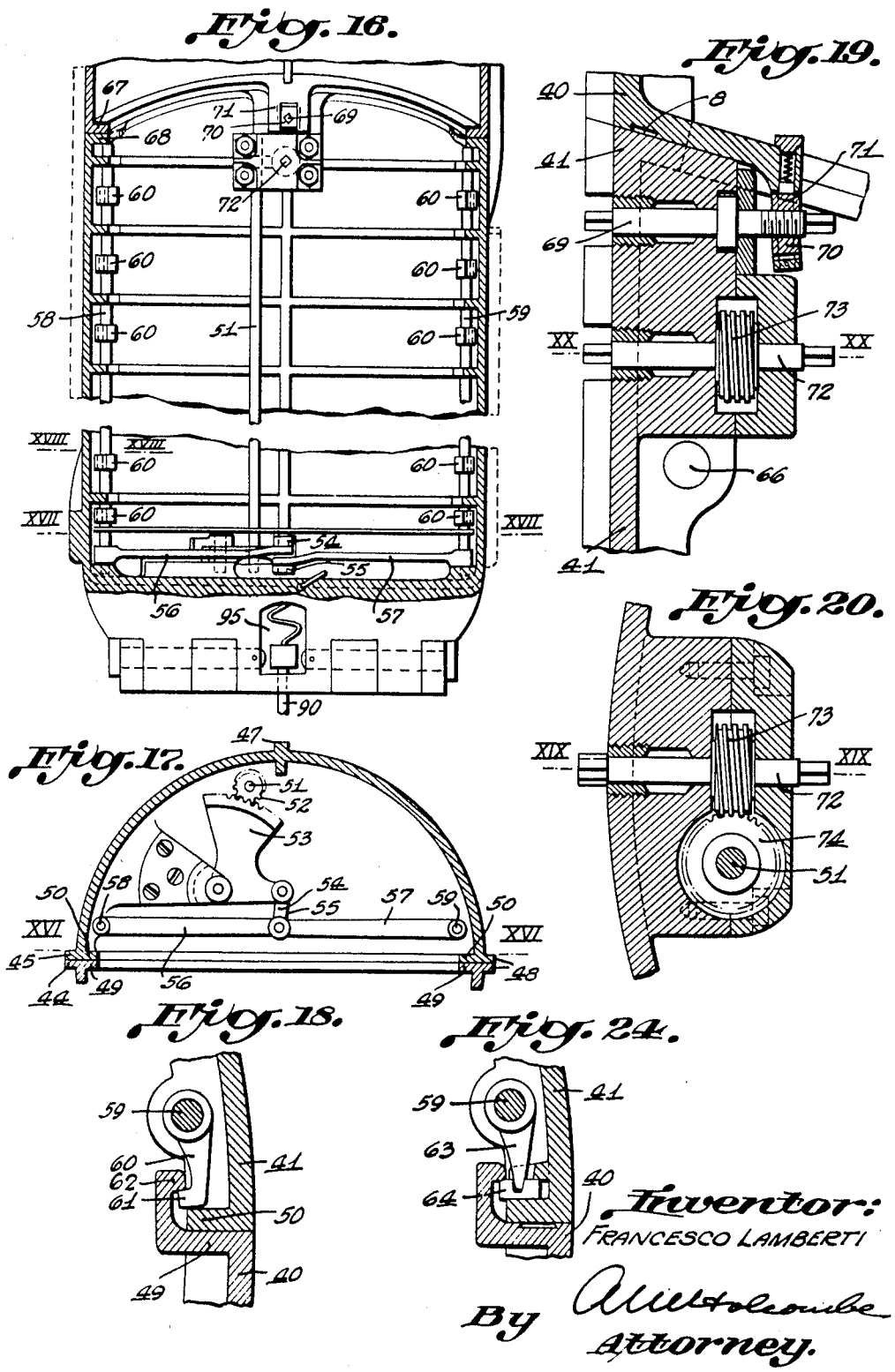

Patented June 20, 1944

2,351,979

UNITED STATES PATENT OFFICE 2,351,979

LIFESAVING AND EXPLORING DEVICE FOR SUBMERGED SUBMARINE VESSELS

Francesco Lamberti, Genoa, Italy; vested in the Alien Property Custodian

Application May 14, 1941, Serial No. 393,434
In Italy May 18, 1940

9 Claims. (Cl. 114—16.7)

This invention has for its object a life-saving and exploring device, especially adapted for use in submerged submarines.

Hitherto the devices of this kind aimed only to allow the outgoing of men from the submerged submarines, in order to save lives in case of accident. Then, having lost any hope to bring the submarine afloat, the men assemble in one or more shelter rooms where the life-saving device or devices are fitted. In these shelter rooms the air pressure is highly increased as a result of the outer water pressure leaking through contiguous passages.

When this pressure is rather high (more than three atmospheres), the men cannot endure it many hours, and on the other hand it is necessary to subject the persons to a gradual de-compression. None of the different types of the said devices makes provision for reducing the air pressure in the shelter room to an atmospheric one, which is a very adverse circumstance to the rescue of the entrapped crew, especially when the saving is effected one man at a time.

By the device according to the present invention the rising of the air pressure in the shelter room is first limited and then gradually lowered to the normal pressure. The service further permits, even by the use of the means on board, the introduction of fresh air into the shelter room from the exterior and the explosion of vicious air.

This permits the occupants to remain for a great time without danger within the shelter rooms, until the rescue is rendered possible.

The device according to the present invention offers, in comparison with the known life-saving devices for submarines, such as usually called lift beacon or life buoy the following features:

1. The particular form of hatch in the previous "lift-beacon devices" is substituted, according to this invention, by the lift itself, which will be referred to hereinafter as "cabin."

2. Means are provided for causing the cabin to set itself always in the same position within its container (which will be referred to as cylinder or "pit") each time the cabin returns thereinto.

3. The cabin and the "pit" show corresponding apertures permitting of opening the doors at the same time from the inside of the safety room.

4. With regards to the features under 1 and 3, fittings are provided in the cabin top for connection to air, electric and other supply lines adapted to be utilised even when the cabin is brought back to the submarine.

5. Cabin and pit doors may be opened and closed from the interior of the cabin and from the exterior of pit, insuring a water-tight closure.

6. Means are provided for facilitating the positioning of the cabin when it returns to the pit.

Other objects, advantages and constructive features of this invention will be apparent from the following specifications, by reference to the attached drawings in which:

Fig. 2 is a plan view of the device shown in Fig. 1, said view showing certain portions in horizontal section;

Fig. 3 is a vertical section of the pit and an elevation of the cabin, the view being taken at right angles to the plane of Fig. 1;

Fig. 4 is an external detail view, somewhat enlarged, of a device for tightly closing the pit door.

Fig. 5 is a vertical section through the device shown in Fig. 4, the section being also taken on line V—V in Figure 6;

Fig. 6 is a sectional plan view taken along line VI—VI in Fig. 5;

Fig. 7 shows in horizontal section some details of the pit and

Fig. 8 is an external view thereof; it is to be noted that in these two figures the same particulars have been shown by dotted lines in order to better point out their shape and position with regards to the other adjacent parts, which are shown by full lines;

Fig. 9 is a view of one of the control members of the pit closing mechanisms;

Fig. 10 is a cross section taken along line X—X in Fig. 9;

Fig. 11 is a view similar to Fig. 7 showing in horizontal section some details of the second closing mechanism;

Figure 12 is a section taken along line XII—XII in Fig. 13;

Fig. 13 is a vertical section taken along line XIII—XIII in Fig. 12;

Figs. 14 and 15 are elevational views of the top and bottom portions respectively of the cabin;

Fig. 16 is a sectional view taken along the line XVI—XVI in Fig. 17;

Fig. 17 is a sectional view taken along line XVII—XVII in Fig. 16;

Fig. 18 is a sectional view taken along line XVIII—XVIII in Fig. 16, showing the closure members for the pit wall;

Fig. 19 is a sectional view taken along line XIX—XIX in Fig. 20 showing the control means of the cabin-closing members;

Fig. 20 is a section on line XX—XX in Fig. 19;

Fig. 21 is a further embodiment of the cabin-top showing a preferred arrangement of the vent-ducts;

Fig. 22 is a section through one of the cabin control-means;

Fig. 23 is a section of one through the members 11 shown in Figs. 4 to 6, in somewhat modified form;

Fig. 24 is a variation of the device shown in Fig. 18.

Figure 1:
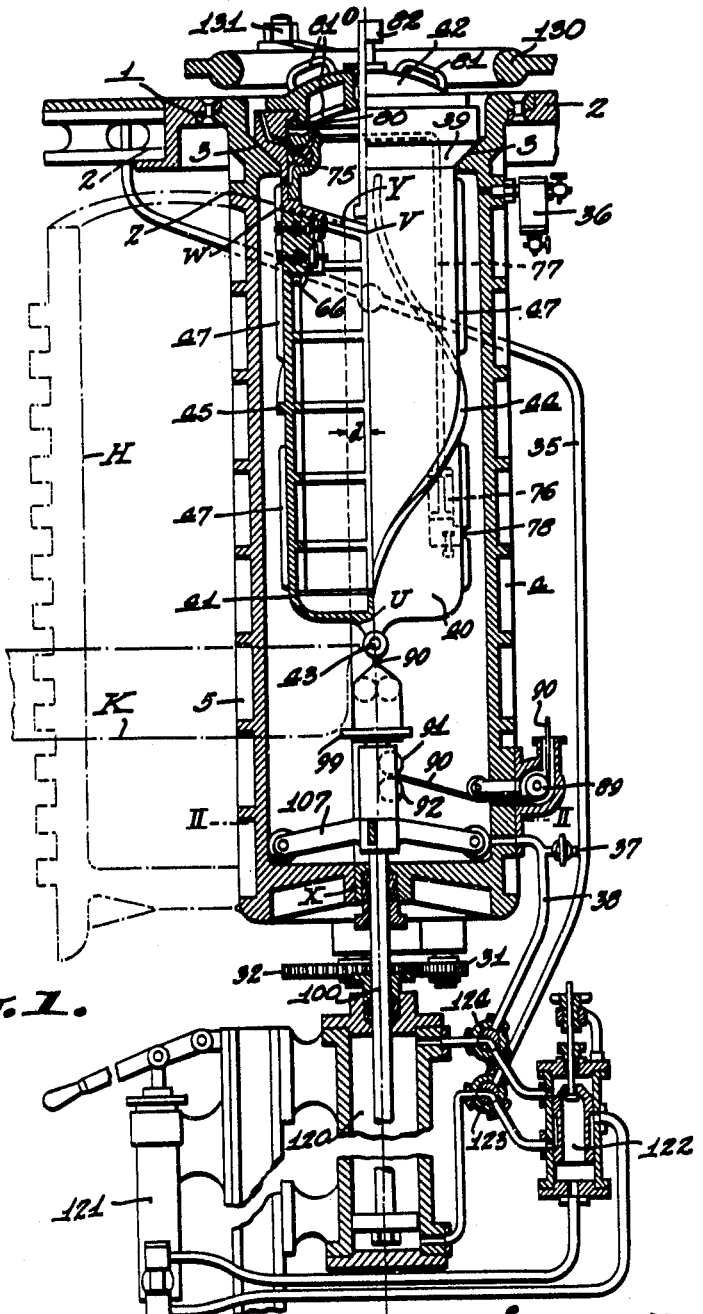
Fig. 1 is a vertical section (on line I—I of Fig. 2) of the pit and one half of the cabin, the other half of the cabin being shown in elevation.

The cylinder or "pit" is the housing member from which the cabin is expelled and to which it returns when hauled down from the surface of the sea. The pit has the form of a cylinder-shaped container with an open top and provided externally with reinforcing ribs. Around the top of the pit opening an annular projection 1 is provided, which serves as an anchor for the cylindrical body of the pit to plate 4 which is fixed to the submarine hull. Interiorly, near the rim of the said opening, the pit has an annular seat 3 on which an annular flange projecting from the cabin body seats like a valve, thereby establishing a water-tight closure between the top part of the cabin and the pit.

The pit comprises parts 4 and 5 connected by flanges or the like, the contacting surfaces or division line between the parts being indicated by planes passing through the broken line XYZ. For simplicity, projection plane passing through XY is shown parallel to the axis of the cylinder, said plane being offset a distance indicated by $d$ and, extending longitudinally from the bottom of the cylinder up to point Y. It is to be noted that the angle XYZ is somewhat greater than a right angle.

Due to the path followed by this broken division line it results that only the part 4 is rigidly fastened to the platform and therefore to the submarine hull, while the part 5 acts as a door for opening or intercepting the communication between the interior of the cylinder and the surrounding room, i. e. the shelter room.

A tight connection between the parts 4 and 5 is provided in order to make the pit leak-proof. On parts 4 and 5 suitable flanges 6 and 7 (Fig. 7) are provided. The width of these flanges is greater than the thickness of the cylinder walls and they serve as connecting members as well as reinforcing ribs. Between these flanges packing material 8 may be inserted in order to ensure the necessary tightness of the joint. This is shown in Figs. 7, 11, 12, 13. In order to keep the packing securely within the joint, suitable grooves may be provided in the packing-holding surfaces.

The above connection, which is provided in the contacting surfaces of the two vertical flanges, i. e. along the contact surfaces that are projected along line WY, is releasably held by means of two distinct devices, which are complementary the one of the other. These two closing devices comprise a cam member closure, which will be referred to as mechanism A, and a closing device comprising a wedge-shaped rod, which will be referred to as mechanism B.

Referring particularly to the upper portion of Fig. 2 and to the left-hand portion of Fig. 3, the mechanism A is such as to permit of member 5 passing from the full-line position (closed position) to the dotted-line position H (opened position) and vice-versa. Member 5 may be provided with suitable rollers which roll during the angular displacements of the member 5 along suitable curved rails.

Referring particularly to the bottom portion of Fig. 2 and to the right-hand portion of Fig. 3, the mechanism B to be employed when the members 5 and 4 are joined together, is provided with a number of jaws or teeth 9 and 10 projecting from the vertical portions of the flanges. The profile of teeth 9 is shown by full lines and the profile of teeth 10 is shown by dotted lines. The said teeth are provided with inturned portions and are so fitted as to intermesh with one another in closing position. Between two intermeshing sets of teeth a wedge-shaped rod 11 may be forced, so as to provide for the tight closure of the members 4 and 5. Rod 11 may be suitably ribbed (see Fig. 23) in order to prevent deformation.

In order to ensure that the rod 11 will shift at right angles to the axis 00 of the pit, the following device is provided: A shaft 12 (Figs. 3 to 6), traversing through a suitable stuffing box in the pit wall and adapted to be controlled from both sides of the wall, carries the worm 13, which worm meshes with worm-gear 14 fitted on shaft 15, said shaft carrying cams 16 and 17. Shaft 15 is supported in bearings 18. Due to this arrangement it is possible to shift the said shafts which are guided in sleeves 19 and 20 carrying cam-slots 21 and 22 operated by the cams and to which the ends of rod 11 are fitted. This therefore is shifted in the direction as shown, in either senses.

Mechanism A (Figs. 3, 9, 13), instead of being provided with teeth, carries in the corresponding portions of flanges 6 and 7 two kinds of intermeshing members, viz. bearings 23 and cam-slot like members 24. Also in Fig. 11 the bearings 23 of member 4 are shown in full lines, while the bearings 24 of member 5 are shown by dotted lines. Thus it is seen that the bores of said bearings are differently shaped to suit the different functions of the bearings and precisely the bores of bearing 23 are cylindrical, while the bores of bearing 24 are flattened on one side so as to function as cam-slots.

The said bearings carry the shaft 25 (Figs. 12 and 13) comprising portions 26 journalled in bearings 23 and cam portions 27 having a like small eccentricity D (Figs. 9, 10, 12, 13).

Figures 12 and 13 show the flange members 6 and 7 interlocked with one another within mechanism A. By angularly shifting shaft 25 in the direction of the arrow (Fig. 12), cams 27 act on cam slots 24 and press member 5 against 4. Shaft 25 is controlled by shaft 28, which is arranged symmetrically of shaft 12 with regards to the diametrical plane of members 4 and 5. As shown, shaft 28 passes through a suitable stuffing box through the wall of member 4. It may be controlled from both ends and acts on shaft 25 by means of a transmission comprising worm 79 and worm-gear 29 fitted on shaft 30 which carries pinion 31 in mesh with a gear 32 on shaft 25.

The provision of a secondary shaft in the mechanism B has not been held necessary. By executing in the described order the operation of the two mechanisms for the outer closure of the pit the force exercised on shaft 15 is reduced and that on shaft 25 is increased, i. e. by forcing first, by means of shaft 15, the rod 11 between teeth 9 and 10, and afterwards, the shaft 25 between the bearings 23 and supports 24 (these operation taking place somewhat gradually due to the elastic packing between flanges 6 and 7).

For the same reason other cams, between cams 16 and 17, have not been provided, although their provision is well possible, if necessary.

At the center of its bottom, the pit is provided with a stuffing box 101 which is penetrated by rod 100 of the centering device.

The cabin (which is the intermediary member serving for establishing the communication and for transferring, within the limits of the possibilities, persons and things between the interior of the submerged submarine and the exterior) has a substantially cylindrical shape and is set upright (cfr. Figures 1, 3, 14 and 15). It is composed of three parts 40, 41 and 42 and is shaped on its exterior, in correspondence of the upper contour of the valve member 39. When seated on seat 3, the upper cylinder portion 39 closes and seals the pit.

Cabin members 40 and 41 have integral therewith inwardly projecting flanges 49 and 50, said flanges serving to establish a tight joint when the members are positioned one against the other.

It will be noted that the shape of members 40 and 41 is similar to the shape of the members 4 and 5 of the pit and in fact UVW (Figures 1, 14 and 15) represents the plane of division of the cabin member which substantially coincides with the transverse plane of division XYZ of the pit; with the difference however that, within the cabin, the plane UV of the vertical part of the contact surface of said flanges has been chosen, for convenience, as passing through the cabin axis. This plane therefore cuts the bottom end (that has been diagrammatically assumed to be plane) along one of its diameters and contains the axis of hinge 43 lying below the cabin bottom. It is to be noted that this hinge the swinging of the member 41 from the full line position in Fig. 1 (corresponding to the closed position of the cabin) to the position K shown by dotted lines in Figures 1 and 2 (corresponding to the opened position of the cabin).

In order to ensure that the cabin, upon coming back into its pit, always assumes the same relative position with regards thereto, a helical surface has been provided. By revolving this surface about its axis, it is compelled to be rotated in one of the two directions along the direction of said axis, and at the same time to pass through a fixed point. In other words, on the outer cabin surface projections 44 and 45 are provided (Figures 1, 3, 14 and 15) the lower outer sides of which form two helical surfaces, having oppositely pitched winding directions; the lower ends of these projections merge on one side of the cabin (Fig. 14) in order to possess a common end, while at their top (Figure 15) the respective projections extend vertically upwardly and in spaced relation to each other, in order that the abutment member 46 may fit therebetween (which during the descent of the cabin has engaged the helical side of one of the projections, by causing first its rotation on its axis). The helical members therefore function finally as guide members for positively shifting the cabin angularly to the desired position. This abutment member 46 may be constituted by a pivot fastened by one of its ends to the inner cylinder wall in the required position in order that the position assumed by the cabin may result as required, and a roller may be provided on the pivot on which the helically-shaped side of one of the projections 44, 45 may roll.

The cabin is further provided with outer straight projections 47, 48 (Figures 1, 3, 14 and 15) set on the generators and which, by sliding on the inner border of seat 3 during the descent of the cabin, coact for insuring the coaxiality of the cabin and pit. In order to fully ensure this co-axiality of the cabin and pit, to the interior of the cylinder some suitably shaped members are fitted between which the cabin, when it comes to rest on seat 3, will snugly fit in proximity of its bottom. As the cabin is necessarily set within its cylinder in the position in which the side doors of cabin and pit come to lie in correspondence with one another, the communication between the interior of the cabin and the shelter room may take place easily. In fact, after having opened the pit door 5 (dotted line position H) also cabin door 41 may be opened towards the exterior by rotating on hinge 43, until it assumes the dotted line position K. By the way, the dimensions of door 41 are less than those of door 5.

As to the manner by which it is possible to tightly close the pit from the interior of the cabin, this is based on the fact that the plane UV of the vertical leaf of the cabin flanges lies arreared, as it passes through 00, with respect to the plane XY of the vertical part of the leaf of the pit flanges. Thus even when the pit is in closing position cabin door 41 is allowed to slightly rotate on hinge 43, between the vertical cabin leaf parts, which were previously in contact with one another, two wedge-shaped slit-openings will be formed, which will be faced exteriorly respectively by two pit wall portions forming part of the fixed member 4. Shafts 12 and 28 for controlling the devices A and B are fitted on the upper portions of said pit walls, through which they pass through stuffing boxes, and have flattened ends in order to permit of operating same both from the interior of the cabin through said wedge-shaped cabin openings as well as from the shelter room on the exterior.

Other shafts may be fitted in like manner, in order to increase the autonomy of the cabin: in the drawings shafts 33 and 97 are shown (Fig. 3), the latter being adapted to cause the door 5 to be brought against the fixed part by means of a windlass and annexed fittings, so as to effect a tight closure of the pit in the same conditions as those hereinbefore described.

The pressure of the water acts on the outer surface and tends to increase the tight closure between flanges 49, 50 of members 40, 41. This tight closure is however additionally insured by a special device, which will be referred as mechanism C (Figures 16 to 20) and which will be particularly described hereinafter. In the main part of mechanism C a shaft 72 is provided which, by means of worm 73 thereon and worm gear 74 on vertical shaft 51 and through pinion 52, toothed sector 53, connecting rods 54 and 55, arms 56 and 57 and shafts 58 and 59, which latter are provided (Fig. 18) with a suitable number of small arms 60, crooked at their ends so as to form hooks 61, pushes said hooks 61 between the back of the vertical flanges 50 of member 41 and the projections 62 of the corresponding parts of the flanges of member 40, the said projections having a profile as shown in Figure 18.

Figure 24 shows a variation according to which the end of each of the arms 63 is not crooked and acts (like a gear tooth between rack teeth) in a hollow provided on the back side of a suitably guided prismatic member 64, pushing same into mesh, with its suitably beveled edge, in like manner as described by reference to tooth 61. The above described main part of mechanism C corresponds to the last closing step of the cabin. This last step may be effected from the interior of the cabin, while the preceding steps aim to bring the member 41 into contact with member 40 and are performed by supplementary parts of mechanism C. The first of said two steps simply utilises the hole 65 on the intermediary rib of member 41 (Figures 1 and 19) as well as another hole 66 provided in member 40 symmetrically with respect to the cabin. By means of any suitable flexible binding means, the ends of which are bound to the borders of 65, 66 and which is tensioned like a bow string, the flange of member 41 is drawn towards member 40 and the inner flattened end of shaft 69 is caused to be pushed into a corresponding threaded bore within slide 70. On the other part, in order to perform the second step, i. e. of securing member 41 in the aforesaid position (by eliminating any flexible binding means) it is sufficient to screw shaft 69 into the threaded bore of slide 70 fitted in a short guide, provided in projection 71 carried by the flange of member 40, and along which the slide may be shifted for a short distance.

It may be noted that, provided sufficient attention is paid, the successive third step of the closing operation by means of mechanism C could be rendered easy by previously filling with sea water the space between pit and cabin.

The upper cabin hatch 42 serves first of all, during the life-saving operations, to permit one or more occupants brought afloat with the cabin, to go out therefrom through the upper opening. The cabin, after its hatch 42 has been again closed, may be hauled down into the pit in order to save other lives.

In order to fasten this hatch 42 in its position, a suitable known system may be employed. The said hatch 42 is pressed by the water pressure in the direction in which the tight closure is enhanced. In the drawings (Figures 1 and 21) the hatch carries on its border some projections 80 with intermeshing teeth bent perpendicularly to the exterior, which, when the hatch is seated on the corresponding tight seat, pass between other teeth carried by 40 by the cabin and returned towards the centre. By acting on one of the handles 81 (Figures 1 and 3), one of which is on the inner side and the other one on the outer side of the hatch 42 the hatch will be shifted angularly in such a manner as to cause its teeth to come into mesh with those of member 40, thus fastening same.

Hatch 42 permits exploring all about, when the cabin is afloat and the submarine is submerged even at a considerable depth. For this purpose a periscope 82 is provided. This method is particularly advantageous, as the floating cabin is much less visible than the characeristic conning tower and, besides being much more difficult to hit, it can be swiftly hauled down and thus the submarine has to come out only when absolutely necessary for employing its weapons.

By reference to Figure 21, it is seen that, according to a modified embodiment, the hatch is provided with an aperture closed by a smaller hatch or cover 83, which can be raised by acting on handle 84 by counteracting the spring 85 tending to close same. By this embodiment, the exploration can be effected by guessing directly around through a slit along the border of 83, above 42.

The possibility of improving the conditions of breathing of the occupants of the shelter chamber is apparent from the above specification, by considering also a detail shown in Figure 21. In this figure a pipe section 86 is shown, integral with hatch 42 and ending on both sides by nipples 87 and 88. Of course a number of conduits might be provided, when desired not only to feed air to permit the occupants to comfortably breathe, but also for other purposes, such as the feeding other fluids, e. g. compressed air for attempting to bring the submarine afloat. By limiting however the above to the introduction of breathing air when the cabin has risen afloat and the hatch 42 (or also simply the small cover according to the modified form) is opened, one of the ends of each of the two pipes with which the submarine is fitted will be sleeved on the corresponding nipples, as shown by 86. The pipe ends might be held up e. g. by means of suitable pneumatic beacon, carrying also preferably a small unit comprising a motor and an air pump. The ends of the pipes connected to the cabin will follow same when hauled back and will fit within the pit, in which, by open doors 4, 41, by means of the inner connections, the said pipes will be connected according to whether they have been employed for feeding fresh air or for letting out vitiated air. In order to perform easily this operation, a pair of auxiliary motorpump units could be provided. It is also apparent that in a similar way other fluids and also electric power might be fed, by means of suitable lines.

Within the space 95, to the exterior of the cabin and below its bottom, the end of a preferably metallic rope 90 is fastened (see Figure 3) which permits the cabin to come afloat and to be hauled down into the pit. The rope or cable 9 may also serve at the same time as supporting guard for any electric cables (phone, electric line etc.) connecting the cabin with the submarine.

In order to wind up and to unwind the cable as necessary, a windlass is provided, the reel of which is distinguished from the usual hawser reels in that it is closed within a casing that is in communication with the cylinder through a duct within which the cable is contained, which cable runs on pulleys whenever necessary, as shown by 89. The windlass shaft, by traversing the casing through a stuffing box, is provided at its outer end with a crank handle. The winding and unwinding of the rope within the cylinder is controlled by a centerer, which comprises a member composed principally of a mechanism E, shown in Figures 1, 3 and 22, having a vertical rod 100 to the upper end of which it is fastened. Rod 100 penetrates the center of the cylinder bottom. Within mechanism E, sleeve 102 (Fig. 22) is directly fastened to the rod, said sleeve supporting the journals of pulleys 91, 92 and is integral with a number of spider arms 104 to 108 that are provided at their ends with rollers. The arms 104, 105 and 107, by sliding longitudinally of the axis on the inner cylindrical surface of the cylinder serve for guiding the center in its displacements longitudinally of the axis. The arms 106 and 108, by sliding within grooves 109 and 110 (Figures 2, 3, 5 to 7 and 11 to 13) along two generators of said surface serve to prevent the centerer revolving about its axis. For illustration purposes the said grooves have been shown in correspondence to the inner borders of the vertical parts of flanges 6 and 7, on Figures 11 and 7. The remaining sleeve 103 is supported by means of pivot 111 for axial rotation, said pivot being supported by sleeve 102.

On the sides of sleeve 102, within suitable hollows, contiguous pulleys 91 and 92 are fitted on the grooves of which the rope 90 is mounted. The rope comes into E and by passing axially through an axial bore of pivot 111 it comes out of the shaft between the grooves of pulleys 93 and 94, which pulleys are also contiguous and are fitted within sleeve 103, acting as centerer head and are connected in suitable manner by their free end to the hollow 95 of the cabin. The previously mentioned supply lines may be provided within the interior of rope 90, and will extend beyond the ends of the rope and be connected to their corresponding apparatus, such as the phone etc. The like may be said for the other rope end.

A device for moving the centerer along the pit axis is shown in the lower part of Figure 1: The rod 100 of the centerer, which is extended downwardly, is also the piston rod of the hydraulic press 120 which is operated by a small pump 121 and constitutes an auxiliary means of the centerer. The desired shiftings of the centerer are obtained by means of a differential valve 122 serving through cocks 123 and 124 to establish the communications with the water pipes coming from press 120, and leading to the suction and delivery valves of pump 121. In order to render it possible to discharge into the sea the water contained within the cylinder, after the cabin has returned thereinto, the same pump 122 might be employed, provided a suitable system of piping and switch cocks be provided. On the contrary, an introduction of water under pressure could be desired between cabin and pit, in order to overcome possible frictional and other resistances hindering the free ascension of the cabin, and especially its leaving seat 3.

In order to improve the method for manoeuvering the cabin, especially whenever the submarine hull lies inclined, a "rectifier" is provided, which consists of a ring 130 fitted to the exterior of the hull, co-axially of and facing the top opening of the pit and fastened by means of enlarged portions 132 to rods 131 traversing, through stuffing boxes, the platform 2. By shifting rods 131 simultaneously the same amount and in the same direction through a mechanism of a known type (e. g. by screw-threading the lower part of the rods and by acting thereon by means of screw nuts operated simultaneously by means of a suitable shaft, or also by a pair of transmission units each comprising a pinion and a rack) the desired shiftings of said ring will be obtained.

Whenever desired to haul the cabin into the pit, the ring 130 (the diameter of which is such as to permit of the cabin to snugly pass therethrough) is gradually projected to a suitable distance from the upper opening of the cylinder, whereafter, having brought the centerer to its upper position, the bottom of the cabin is hauled down towards the centerer head. On the other hand the ring 130, in its upward movement, by sliding along the periphery of the cabin, or also along the longitudinal projections thereof, draws the cabin with its axis nearer to that of the pit. If at this point the centerer is hauled down together, whenever possible, with the rectifier, by simultaneously drawing the rope the cabin will be forced back into the pit to cause ring 39 to lie on seat 3.

If, on the contrary, the cabin should go out of the pit, it will be convenient to proceed as described, but in inverse order, in order to maintain the co-axiality of the cabin and of the pit until the former is completely out of the latter.

In order to complete the description of the device, that has been shown only by way of example, it is to be noted that the shaft 33 (that can be controlled from the interior of the cabin, as well as from the room within the pit) serves for opening and closing valve 34 intercepting pipe 35 which puts the sea into communication with pump 121. In Fig. 1 a short valve pipe section 37 is shown, which, by establishing the communication between pipes 35 and 38, permits the establishing of communication between the interior of the pit with the sea, as well as the interception of this communication, as desired, e. g. whenever the cabin should be thrown out or hauled into the cylinder, as mentioned.

36, Fig. 1, is an automatic vent valve through which the air within the pit is discharged, whenever the same is to be filled with water. This valve comprises a box, which box is provided at its bottom with a drainage cock and at its side with a vent valve. The box contains a float serving, by acting on a suitable valve, to intercept the communication with the pit, whenever the water therein has reached such a level, as to flow over into the box.

Within the cabin also the three-way cock 75 (Figures 1 and 21) is fitted, so as to either put the interior of the cabin into communication with the pit, room or to permit of the pit, communicating with the sea.

76 (Fig. 1) is a small pump the suction side of which is in communication, through pipe 77, with cock 75, while the delivery leads to the interior of the pit through aperture 78 provided in the cabin wall. Thus it is possible, by suitably setting cock 75 so as to open the suction from the sea, to obtain, by the action of said pump, a positive pressure within the pit, for the aforementioned purposes.

The operation is as follows: The cabin has a sufficient buoyancy in order to bring its own weight, as well as that of the occupants and materials, to the surface of the water, assuming the submarine to be under water, but not inclined. The persons to be saved, enter the part 40 of the cabin when the door 41 is lowered after which both the pit and cabin doors are closed. Then valve 34 and the cock on pipe 37 are opened. Thus the water will flow into the pit, all around the cabin, and the air will be consequently expelled through the above described vent valve. It may be mentioned that, when within the pit and all about the cabin water under the environing pressure is present, this is not sufficient pressure for causing the cabin to leave its seat on the pit. In order to effect this, it is necessary to intercept pipe 37 and to generate within the cylinder an extra pressure by operating one of the pumps 76 or 121. It is also necessary to provide for replacing with additional water the space of the pit just left vacant by the ascending cabin. As soon as the cabin is completely out of the pit its lifting speed steadily increases and in order to avoid an excessive speed, its ascension will be suitably braked by the same windlass that has been described above.

When it is desired to haul the cabin back into the pit, it will be sufficient to pull the rope by means of the windlass, while the centerer is left in its upper position. When the cabin has come into contact with the upper end of the centerer, the centerer will be retracted by means of the hydraulic press and by the co-action of the windlass, until the centerer has reached its lower position and the cabin is seated on 3. In order to ascertain this position, usual signalling means will be provided, as a lamp or other luminous object or if necessary, acoustical signals. In order to control the tight seating of cabin on its pit some water will be pumped from the space between the pit and the cabin in order to detect whether a sufficient reduction of pressure takes place. In this latter case it will be possible to proceed with the life-saving operations.

In case the hull is inclined, the saving of the lives will present no difficulty while some persons remain out of the cabin and can operate the centerer and the rectifier. In order however to save the life of the last occupant of the submarine, the following additional means are provided.

The cylinder 120 of the press is provided on its top end with a port which is closed in normal use, when the cylinder acts as hydraulic press, but serves as a vent, when the port is uncovered. The lower side of the cylinder is put into communication with a reservoir containing compressed air by means of a pipe provided with an automatic valve of suitable type, which opens and establishes the communication of the compressed air reservoir and the cylinder when the pressure of the water within the space between the pit and cabin has reached a sufficient value. In order to avoid a ramming action of the piston head against the bottom of the cabin, suitable means are provided, as, e. g. a two-part sleeve having the parts adapted to be connected by bolts or the like and which can be fitted when necessary so as to envelop sleeve 103 with its border fitted in such a manner as to transmit the pushing action. It is to be noted that the last occupant will first set the rectifier ring 130 a certain distance above the cylinder end, so as to provide for an additional guide before the cabin leaves completely the pit.

The operation of this device is apparent, as are also apparent the advantages inherent thereto.

It is to be noted however that, although the device has been described completely, including some constructional feature which may be embodied in a number of other different ways, this has been done only in order to give a complete constructional embodiment of the invention and it will be understood that the said accessory devices will be claimed only in combination with the basic idea of the invention, as set out in the preamble and as will be claimed hereinafter.

I claim:

1. A life-saving device for submarines, including a pit to be secured to and extending within the submarine, said pit being open at the top and closed at the bottom, a buoyant cabin fitting within the pit and having a sealing connection with the upper end of the pit, a cable connection between the cabin and pit to permit the cabin to move beyond the pit and be redrawn thereinto at will, means connected to the pit and movable beyond the same to guide one end of the cabin while entering the pit, and a centering means for coacting with said first-named means to simultaneously guide the other end of said cabin while entering the pit.

2. A construction as defined in claim 1, wherein said first-named guiding means includes an annular member having an internal diameter corresponding to the external diameter of the cabin, and means for adjusting the member axially relative to the pit.

3. A construction as defined in claim 1, wherein said first-named guiding means includes an annular member having an internal diameter corresponding to the external diameter of the cabin, and means for adjusting the member axially relative to the pit, said adjusting means maintaining the member in fixed alignment with the pit.

4. A construction as defined in claim 1, wherein said first-named guiding means includes an annular member having an internal diameter corresponding to the external diameter of the cabin, rods movable axially of the pit and connected to said annular member, and means for moving said rods in either direction.

5. A life-saving device for submarines, including a pit to be secured to and extending within the submarine, said pit being open at the top and closed at the bottom, a buoyant cabin fitting within the pit and having a sealing connection with the upper end of the pit, a cable connection between the cabin and pit to permit the cabin to move beyond the pit and be redrawn thereinto at will, the pit including a movable section and a fixed section, interfitting lugs on the meeting edges of the sections, a locking rod for cooperating with such lugs to secure the pit sections in fixed relation, and means for operating the rod to secure or release the lugs at will.

6. A construction as defined in claim 5, wherein the rod operating means is actuated from the interior and exterior of the pit.

7. A life-saving device for submarines, including a pit to be secured to and extending within the submarine, said pit being open at the top and closed at the bottom, a buoyant cabin fitting within the pit and having a sealing connection with the upper end of the pit, a cable connection between the cabin and pit to permit the cabin to move beyond the pit and be redrawn thereinto at will, an axially movable shaft penetrating said pit and having one end thereof normally supporting the lower end of said cabin, and a hydraulic jack disposed on the exterior of the pit and cooperating with the shaft to force the cabin from the pit when required.

8. A construction as defined in claim 1 wherein said centering means and first-named guiding means are both axially movable of said pit, and wherein said pit has a trackway engaged by said centering means during its axial movement for preventing rotation of the centering means about the axis of its movement.

9. A life-saving device for submarines, including a pit to be secured to and extending within the submarine, said pit being open at the top and closed at the bottom, a buoyant cabin fitting within the pit, means for closing the upper end of said pit while said cabin is disposed therein, said pit and said cabin each having a door in the sidewall thereof, a cable connection between the cabin and pit to permit the cabin to move beyond the pit and be redrawn thereinto, a pair of oppositely pitched helical projections beginning at a common point on the exterior of the cabin and each extending upwardly from the point substantially half way around the cabin, and a projection on the interior of said pit for engaging one of said helical projections whereby the cabin may be rotated about its axis of bodily movement substantially 180 degrees when entering the pit to thereby cause the door in the cabin to coincide with the door in the pit.

FRANCESCO LAMBERTI.